United States Patent
Yang et al.

(10) Patent No.: US 9,621,320 B2
(45) Date of Patent: Apr. 11, 2017

(54) METHOD AND APPARATUS FOR SELECTING TRANSPORT FORMAT

(71) Applicant: Huawei Technologies Co., Ltd., Shanzhen (CN)

(72) Inventors: Yi Yang, Shanghai (CN); Gengshi Wu, Shanghai (CN); Meng Hua, Shanghai (CN); Xiaolei Tie, Shanghai (CN); Shurong Jiao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 239 days.

(21) Appl. No.: 14/449,370

(22) Filed: Aug. 1, 2014

(65) Prior Publication Data

US 2014/0341162 A1    Nov. 20, 2014

Related U.S. Application Data

(63) Continuation of application No. PCT/CN2013/070646, filed on Jan. 18, 2013.

(30) Foreign Application Priority Data

Feb. 2, 2012 (CN) .......................... 2012 1 0023369

(51) Int. Cl.
*H04W 72/14* (2009.01)
*H04L 5/00* (2006.01)
(Continued)

(52) U.S. Cl.
CPC .......... *H04L 5/0053* (2013.01); *H04L 1/0007* (2013.01); *H04L 1/0015* (2013.01); *H04W 24/02* (2013.01); *H04W 72/14* (2013.01)

(58) Field of Classification Search
None
See application file for complete search history.

(56) References Cited

U.S. PATENT DOCUMENTS

| 2012/0099548 A1 | 4/2012 | Yan et al. |
| 2012/0177089 A1* | 7/2012 | Pelletier ............... H04B 7/0417 375/219 |
| 2012/0281642 A1* | 11/2012 | Sambhwani ........ H04W 52/325 370/329 |

FOREIGN PATENT DOCUMENTS

| CN | 101466123 A | 6/2009 |
| CN | 101577571 A | 11/2009 |

(Continued)

OTHER PUBLICATIONS

"3rd Generation Partnership Project; Technical Specification Group Radio Access Network; Physical layer procedures (FDD) (Release 11)," 3GPP TS 25.214, Technical Specification, V11.0.0, Dec. 2011, 106 Pages.

(Continued)

*Primary Examiner* — Yemane Mesfin
*Assistant Examiner* — Jeff Banthrongsack
(74) *Attorney, Agent, or Firm* — Conley Rose, P.C.

(57) ABSTRACT

A method and an apparatus for selecting a transport format are provided. The method includes: receiving a transport format parameter of a user equipment sent by a base station, where the transport format parameter of the user equipment includes a primary stream grant value and an association between the primary stream and the secondary stream; determining a maximum transport block length of the primary stream according to a preset value of the maximum transmit power of the user equipment and the association between the primary stream and the secondary stream; determining an actual transport block length of the primary stream according to a size relationship between a theoretical transport block length of the primary stream and the maximum transport block length; and determining a transport block length of the secondary stream.

19 Claims, 12 Drawing Sheets

(51) Int. Cl.
*H04L 1/00* (2006.01)
*H04W 24/02* (2009.01)

(56) References Cited

FOREIGN PATENT DOCUMENTS

| CN | 101615938 A | 12/2009 |
|---|---|---|
| CN | 101820649 A | 9/2010 |
| CN | 101938786 A | 1/2011 |
| CN | 102571286 A | 7/2012 |
| EP | 2437565 A1 | 4/2012 |
| EP | 2552153 A1 | 1/2013 |
| WO | 2011127358 A1 | 10/2011 |

OTHER PUBLICATIONS

"3rd Generation Partnership Project; Technical Specification Group Radio Access Network; Medium Access Control (MAC) protocol specification (Release 11)," 3GPP TS 25.321, V11.0.0, Technical Specification, Dec. 2011, 198 Pages.

Ericsson, "Initial considerations on the design for UL MIMO for HSUPA," 3GPP TSG RAN WG1 Meeting #63bis, Dublin, Ireland, R1-110496, Jan. 17-21, 2011, 16 pages.

QUALCOMM Incorporated, "Explaining scheduler operation for UL-MIMO with an example," 3GPP TSG RAN WG1 Meeting #65, Barcelona, Spain, R1-111258, May 9-13, 2011, 5 pages.

Nokia Siemens Networks, "Uplink MIMO operation principles," 3GPP TSG WG1 Meeting #65, Barcelona, Spain, R1-111493, May 9-13, 2011, 6 pages.

Foreign Communication From a Counterpart Application, PCT Application No. PCT/CN2013/070646, English Translation of International Search Report dated Apr. 25, 2013, 3 pages.

Foreign Communication From a Counterpart Application, PCT Application No. PCT/CN2013/070646, English Translation of Written Opinion dated Apr. 25, 2013, 10 pages.

Foreign Communication From a Counterpart Application, Chinese Application No. 201210023369.5, Chinese Office Action dated Jan. 10, 2014, 16 pages.

Foreign Communication From a Counterpart Application, European Application No. 13744341.2, Extended European Search Report dated Oct. 21, 2014, 8 pages.

Partial English Translation and Abstract of Chinese Patent Application No. CN102571286A, Sep. 2, 2014, 4 pages.

\* cited by examiner

METHOD AND APPARATUS FOR SELECTING TRANSPORT FORMAT

CROSS-REFERENCE TO RELATED APPLICATIONS

This application is a continuation of International Application No. PCT/CN2013/070646, filed on Jan. 18, 2013, which claims priority to Chinese Patent Application No. 201210023369.5, filed on Feb. 2, 2012, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the communications field, and in particular, to a method and an apparatus for selecting a transport format.

BACKGROUND

Currently, an Uplink Multiple Input Multiple Output (UL MIMO) feature is to be introduced into the 3rd Generation Partnership Project (3GPP) to enable a user equipment to transmit uplink data to a base station by using a primary stream and a secondary stream, where the data includes scheduling grant service data and non-scheduling grant service data. In the prior art, to implement the UL MIMO feature, the user equipment may determine a transport format of the primary stream and the secondary stream according to indication information delivered by the base station, and the user equipment transmits the uplink data according to the determined transport format of the primary stream and the secondary stream. In a case in which transmit power of the user equipment is insufficient, reduction of data transmission quality may be caused. If the user equipment also needs to transmit non-grant scheduling information by using the primary stream or the secondary stream, it may cause that a channel signal-to-noise ratio of the primary stream and the secondary stream are different, and affect decoding performance when data is decoded at a receive end of the base station.

SUMMARY

Embodiments of the present invention provide a method and an apparatus for selecting a transport format, which can determine a transport format of a primary stream and a secondary stream according to a maximum transmit power of a user equipment and a channel quality difference between the primary stream and the secondary stream, thereby ensuring data transmission quality.

To achieve the foregoing objectives, the following technical solutions are adopted in the embodiments of the present invention:

A method for selecting a transport format, including: receiving a transport format parameter of a user equipment sent by a base station, where the transport format parameter of the user equipment includes a primary stream grant value and an association between a primary stream and a secondary stream; determining a maximum transport block length of the primary stream; determining an actual transport block length of the primary stream according to a size relationship between a theoretical transport block length of the primary stream and the maximum transport block length, where the theoretical transport block length of the primary stream is determined by a block length of scheduling grant data and/or a block length of non-scheduling grant data, where the scheduling grant data and the non-scheduling grant data are transmitted by the primary stream, and the block length of the scheduling grant data is determined by the primary stream grant value; and determining a transport block length of the secondary stream according to the actual transport block length of the primary stream and the association between the primary stream and the secondary stream.

An apparatus for selecting a transport format, including: a receiving unit configured to receive a transport format parameter of a user equipment sent by a base station, where the transport format parameter of the user equipment includes a primary stream grant value and an association between a primary stream and a secondary stream; a first determining unit configured to determine a maximum transport block length of the primary stream; a second determining unit configured to determine an actual transport block length of the primary stream according to a size relationship between a theoretical transport block length of the primary stream and the maximum transport block length determined by the first determining unit, where the theoretical transport block length of the primary stream is determined by a block length of scheduling grant data and/or a block length of non-scheduling grant data, where the scheduling grant data and the non-scheduling grant data are transmitted by the primary stream, and the block length of the scheduling grant data is determined by the primary stream grant value; and a third determining unit configured to determine a transport block length of the secondary stream according to the actual transport block length of the primary stream and the association between the primary stream and the secondary stream, where the actual transport block length of the primary stream is determined by the second determining unit.

According to a method and an apparatus for selecting a transport format provided in embodiments of the present invention, a transport block length of a primary stream is generated by means of calculation according to a primary stream grant value and an association between the primary stream and a secondary stream, where the primary stream grant value and the association between the primary stream and the secondary stream are sent by a base station; and a transport block length of the secondary stream is generated according to the transport block length of the primary stream. A transport format of the primary stream and the secondary stream can be determined according to a maximum transmit power of a user equipment and a channel quality difference between the primary stream and the secondary stream, thereby ensuring data transmission quality, and ensuring decoding performance when data sent by the user equipment by using the two streams is decoded at a receive end of the base station.

BRIEF DESCRIPTION OF THE DRAWINGS

To describe the technical solutions in the embodiments of the present invention more clearly, the following briefly introduces the accompanying drawings required for describing the embodiments or the prior art. The accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
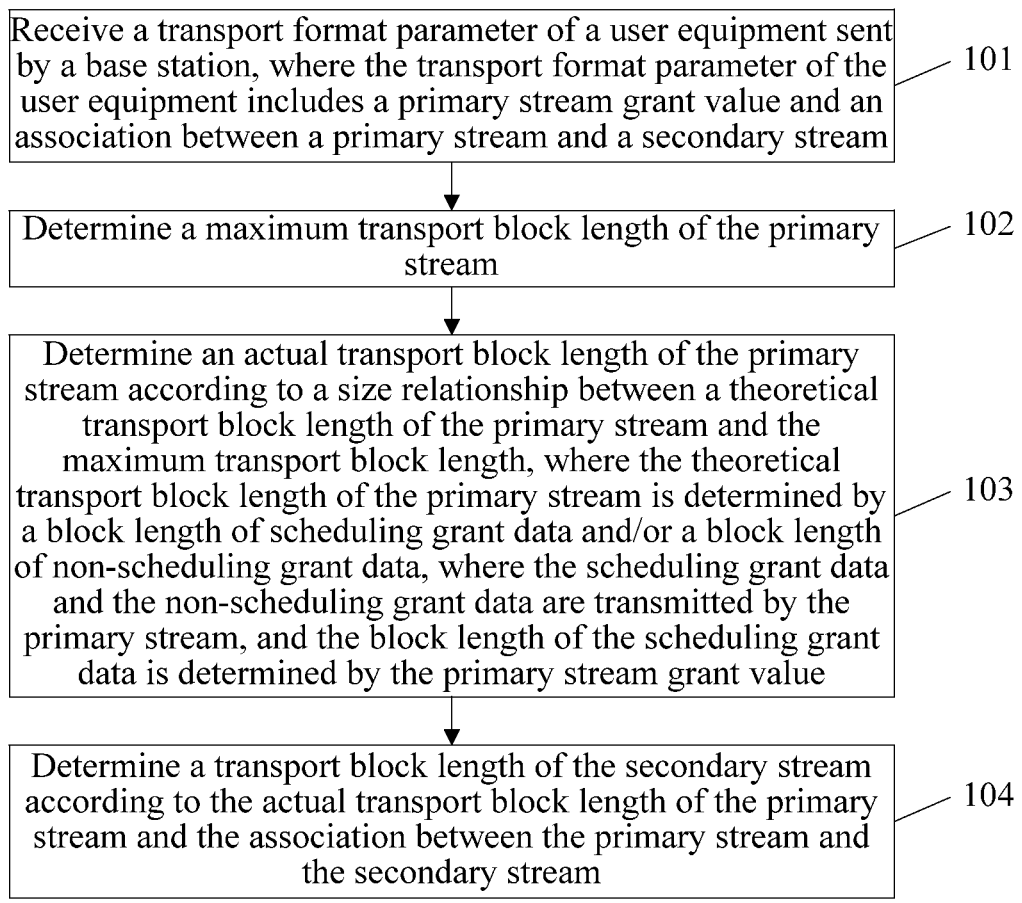
FIG. 1 is a flowchart of a method for selecting a transport format according to Embodiment 1 of the present invention.

This embodiment of the present invention provides a method for selecting a transport format. As shown in FIG. 1, the method includes:

101. Receive a transport format parameter of a user equipment sent by a base station, where the transport format parameter of the user equipment includes a primary stream grant value and an association between a primary stream and a secondary stream.

The primary stream grant value is scheduling information that is sent by the base station to the user equipment, and is used to indicate an available maximum transmit power of the user equipment when sending new data on the primary stream.

The association between the primary stream and the secondary stream includes a channel quality ratio of the primary stream and the secondary stream, or a block length indication sequence number offset of the primary stream and the secondary stream.

102. Determine a maximum transport block length of the primary stream.

103. Determine an actual transport block length of the primary stream according to a size relationship between a theoretical transport block length of the primary stream and the maximum transport block length, where the theoretical transport block length of the primary stream is determined by a block length of scheduling grant data and/or a block length of non-scheduling grant data, where the scheduling grant data and the non-scheduling grant data are transmitted by the primary stream, and the block length of the scheduling grant data is determined by the primary stream grant value.

The scheduling grant data is data of a transport block length that is configured by the user equipment and bears the non-scheduling grant data, and the transport block length that bears the scheduling grant data is variable; and the non-scheduling grant data is data of a transport block length that is configured by the base station and bears the non-scheduling grant data, and the transport block length that bears the non-scheduling grant data is invariable.

The determining an actual transport block length of the primary stream according to a size relationship between a theoretical transport block length of the primary stream and the maximum transport block length may be implemented in the following manner, including: performing calculation according to the primary stream grant value to generate the block length of the scheduling grant data; acquiring the block length of the non-scheduling grant data, and performing calculation by adding half of the block length of the scheduling grant data to the block length of the non-scheduling grant data, so as to obtain the theoretical transport block length of the primary stream; and comparing a value of the theoretical transport block length of the primary stream with a value of the maximum transport block length, and determining that the smaller one of the two is used as the actual transport block length of the primary stream.

The foregoing implementation method of the determining an actual transport block length of the primary stream according to a size relationship between a theoretical transport block length of the primary stream and the maximum transport block length specifically includes that:

A terminal calculates, according to the primary stream grant value and by using an interpolation or extrapolation formula, that the block length of the scheduling grant data is a. If the block length of the non-scheduling grant data is b, the block length of the scheduling grant data is reduced to a−b/2 first, and the transport block length on the current primary stream of the terminal is A, where A=a+b/2; then, A is compared with the maximum transport block length B on the primary stream, and the smaller one between A and B is finally selected as the transport block length of the primary stream.

Further, if A is still greater than B when A=a+b/2, the block length of the scheduling grant data in A is further reduced until a primary transport block transmits data according to the length B.

The extrapolation formula is:

$$\left[ K_{e,ref,m} \cdot \frac{\text{Serving\_Grant}}{L_{e,ref,m} \cdot A_{ed,m}^2 \cdot 10^{\Delta harq/10}} \right]. \quad \text{(Formula 1)}$$

The interpolation formula is:

$$\left[ K_{e,ref,m} + \frac{\left( \frac{Serving\_Grant}{10^{\Delta harq/10}} - L_{e,ref,m} \cdot A^2_{ed,m} \right)(K_{e,ref,m+1} - K_{e,ref,m})}{L_{e,ref,m+1} \cdot A^2_{ed,m+1} - L_{e,ref,m} \cdot A^2_{ed,m}} \right]. \quad \text{(Formula 2)}$$

Serving_Grant is the primary stream grant value that is sent by the base station to the user equipment; $A_{ed,m}$ indicates an amplitude offset of an $m^{th}$ reference Enhanced Dedicated Channel Transport Format Combination Indicator (E-TFCI); $L_{e,ref,m}$ indicates the number of Enhanced Dedicated Physical Data Channel (E-DPDCH) channels of the $m^{th}$ reference E-TFCI; $K_{e,ref,m}$ indicates a transport block size corresponding to the $m^{th}$ reference E-TFCI; and $\Delta$harq indicates a power offset in a Hybrid Automatic Repeat Request (HARQ) process configured in each Media Access Control-dedicated (MAC-d) stream, which is determined by a Quality of Service (QoS) attribute.

It should be noted that, among parameters involved in the foregoing Formula 1 and Formula 2, except that an updated value may be delivered by the base station for Serving_Grant at each transmit time interval (TTI), and other parameters are relatively stable and do not update at each TTI. A specific updating manner of the foregoing parameters is a technology well-known to a person skilled in the art, which is not described in detail in this embodiment of the present invention.

In addition, it should be noted that, if the theoretical transport block of the primary stream does not include the transport block of the non-grant data, there is no need to change the block length of the theoretical transport block of the primary stream first. The theoretical transport block of the primary stream may be directly compared with the maximum transport block length, and a smaller value may be selected as the actual transport block length of the primary stream.

104. Determine a transport block length of the secondary stream according to the actual transport block length of the primary stream and the association between the primary stream and the secondary stream.

An implementation method of the determining a transport block length of the secondary stream may be implemented according to the actual transport block length of the primary stream and the channel quality ratio of the primary stream and the secondary stream, and may also be implemented by means of calculation according to the actual transport block length of the primary stream and the block length indication sequence number offset of the primary stream and the secondary stream, which is not limited in this embodiment of the present invention.

In addition, it should be noted that, if there is at least one stream used for data retransmission in the primary stream and the secondary stream, a data block length used by the stream that is used for data retransmission is the same as a data block length used by a stream that initially transmits the data.

In addition, it should be noted that, the non-scheduling grant data is borne on a stream for transmission, where the stream is in the primary stream and the secondary stream and performs outer loop power control. In this embodiment, if the stream that performs the outer loop power control in the base station is the primary stream, the non-scheduling grant data is borne on the primary stream for transmission.

According to a method for selecting a transport format provided in this embodiment of the present invention, a transport block length of a primary stream is generated by means of calculation according to a primary stream grant value and an association between the primary stream and a secondary stream, where the primary stream grant value and the association between the primary stream and the secondary stream are sent by a base station; and a transport block length of the secondary stream is generated according to the transport block length of the primary stream. A transport format of the primary stream and the secondary stream can be determined according to a maximum transmit power of a user equipment and a channel quality difference between the primary stream and the secondary stream, thereby ensuring data transmission quality, and decoding performance when data sent by the user equipment by using the two streams is decoded at a receive end of the base station.

Embodiment 2

Figure 2:
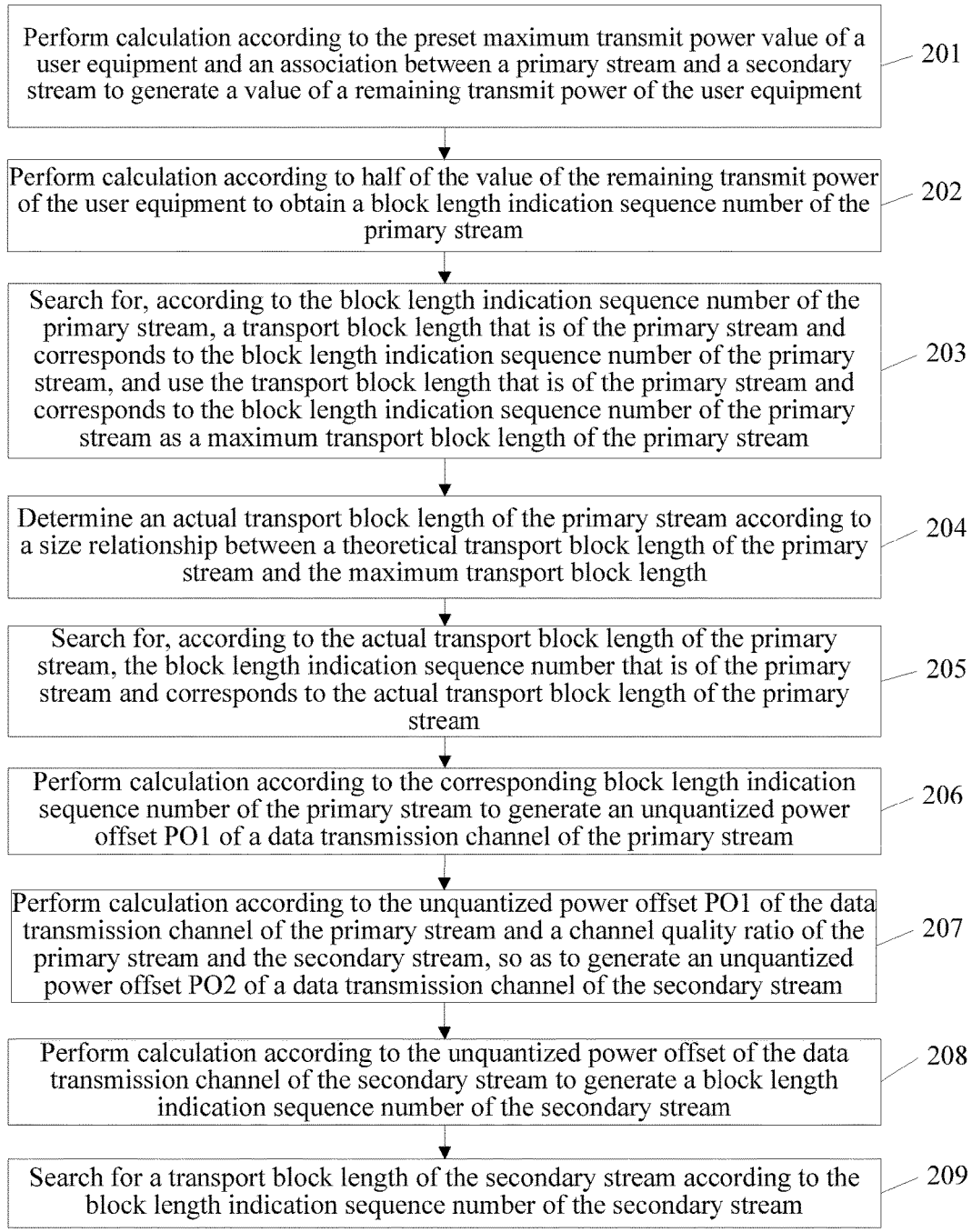
FIG. 2 is a flowchart of a method for selecting a transport format according to Embodiment 2 of the present invention.

This embodiment of the present invention provides a method for selecting a transport format, which is mainly applied to a process of selecting a transport format of a primary stream and a secondary stream when a user equipment sends information to a base station. When transmit powers of data channels of the primary stream and the secondary stream are the same, where the data channel is an E-DPDCH, as shown in FIG. 2, the method includes:

201. Perform calculation according to the preset value of a maximum transmit power of a user equipment and an association between a primary stream and a secondary stream to generate a value of a remaining transmit power of the user equipment.

The preset value of the maximum transmit power of the user equipment is relevant to a type of the user equipment. A value of the maximum transmit power may be set to different values for different types of user equipments according to an actual situation, and may also be set to a value delivered by a high layer of the user equipment, which is not limited in this embodiment of the present invention.

It should be noted that, the performing calculation according to the preset value of the maximum transmit power of the user equipment and an association between a primary stream and a secondary stream to generate a value of the remaining transmit power of the user equipment may be implemented in the following manner, which specifically includes:

A formula for calculating the value of the remaining transmit power of the user equipment is $NRPM_{j,r} = (PMax_{j,r} - P_{DPCCH,target} - P_{S\text{-}DPCCH} - P_{DPDCH} - P_{HS\text{-}DPCCH} - P_{E\text{-}DPCCH,j} - P_{S\text{-}E\text{-}DPCCH,j,r})/P_{DPCCH,target}$, where j indicates an E-TFCI of the primary stream; r indicates a channel quality ratio of the primary stream and the secondary stream; $P_{DPCCH,target}$, $P_{S\text{-}DPCCH}$, $P_{DPDCH}$ and $P_{HS\text{-}DPCCH}$ respectively indicate transmit powers of a Dedicated Physical Control Channel (DPCCH), a Secondary Dedicated Control Channel (S-DPCCH), a Dedicated Physical Data Channel (DPDCH), and a High Speed-Dedicated Physical Control Channel (HS-DPCCH); $P_{E\text{-}DPCCH,j}$ and $P_{S\text{-}E\text{-}DPCCH,j,r}$ indicate transmit powers of an Enhanced Dedicated Physical Control Channel (E-DPCCH) and a Secondary Enhanced Dedicated Physical Control Channel (S-E-DPCCH), where $P_{E\text{-}DPCCH,j}$ and $P_{S\text{-}E\text{-}DPCCH,j,r}$ are obtained by means of calculation according to values of j and r; $PMax_{j,r}$ indicates a maximum transmit power that can be used by the user equipment, is obtained by means of calculation according to the values of j and r, and may be obtained by using a formula $PMax_{j,r} = PMax - TFC\_MPR_{j,r}$, where PMax is a preset maximum transmit power, and $TFC\_MPR_{j,r}$ indicates a maximum transmit power backoff value of the user equipment obtained by means of calculation according to the values of j and r.

It should be noted that, if the association, between the primary stream and the secondary stream, which is received by the user equipment and sent by the base station is a block length indication sequence number offset of the primary stream and the secondary stream, the block length indication sequence number offset of the primary stream and the secondary stream needs to be converted into the channel quality ratio of the primary stream and the secondary stream before subsequent calculations are performed. A specific manner is a technology well-known to a person skilled in the art, which is not described in detail in this embodiment of the present invention.

202. Perform calculation according to half of the value of the remaining transmit power of the user equipment to obtain a block length indication sequence number of the primary stream.

An implementation method of performing calculation to obtain the block length indication sequence number according to a power value is a technology well-known to a person skilled in the art. Therefore, the implementation method of the performing calculation according to half of the value of the remaining transmit power of the user equipment to obtain a block length indication sequence number of the primary stream is not described in detail in this embodiment of the present invention.

203. Search for, according to the block length indication sequence number of the primary stream, a transport block length that is of the primary stream and corresponds to the block length indication sequence number of the primary stream, and use the transport block length that is of the primary stream and corresponds to the block length indication sequence number of the primary stream as a maximum transport block length of the primary stream.

A correspondence between a block length indication sequence number and a transport block length is specified in the prior art, which is not described in detail in this embodiment of the present invention. Based on the correspondence, the implementation manner of searching for, according to the block length indication sequence number of the primary stream, a transport block length that is of the primary stream and corresponds to the block length indication sequence number of the primary stream is a technology well-known to a person skilled in the art, which is not described in detail in this embodiment of the present invention.

204. Determine an actual transport block length of the primary stream according to a size relationship between a theoretical transport block length of the primary stream and the maximum transport block length.

The implementation manner of step 204 is the same as the implementation manner of step 103, which is not repeatedly described in this embodiment of the present invention.

205. Search for, according to the actual transport block length of the primary stream, the block length indication sequence number that is of the primary stream and corresponds to the actual transport block length of the primary stream.

The implementation manner of searching for, according to the actual transport block length of the primary stream, the block length indication sequence number that is of the primary stream and corresponds to the actual transport block length of the primary stream is similar to the implementation manner of step 203, which is not limited in this embodiment of the present invention.

206. Perform calculation according to the block length indication sequence number that is of the primary stream and corresponds to the actual transport block length of the primary stream, so as to generate an unquantized Power Offset 1 (PO1) of a data transmission channel of the primary stream.

207. Perform calculation according to the unquantized power offset PO1 of the data transmission channel of the primary stream and a channel quality ratio of the primary stream and the secondary stream, so as to generate an unquantized Power Offset 2 (PO2) of a data transmission channel of the secondary stream. PO2=PO1*r, where r is the channel quality ratio of the primary stream and the secondary stream.

208. Perform calculation according to the unquantized power offset of the data transmission channel of the secondary stream to generate a block length indication sequence number of the secondary stream.

209. Search for a transport block length of the secondary stream according to the block length indication sequence number of the secondary stream.

The implementation method of searching for a transport block length of the secondary stream according to the block length indication sequence number of the secondary stream is similar to the implementation manner of step 203, which is not repeatedly described in this embodiment of the present invention.

Figure 3:
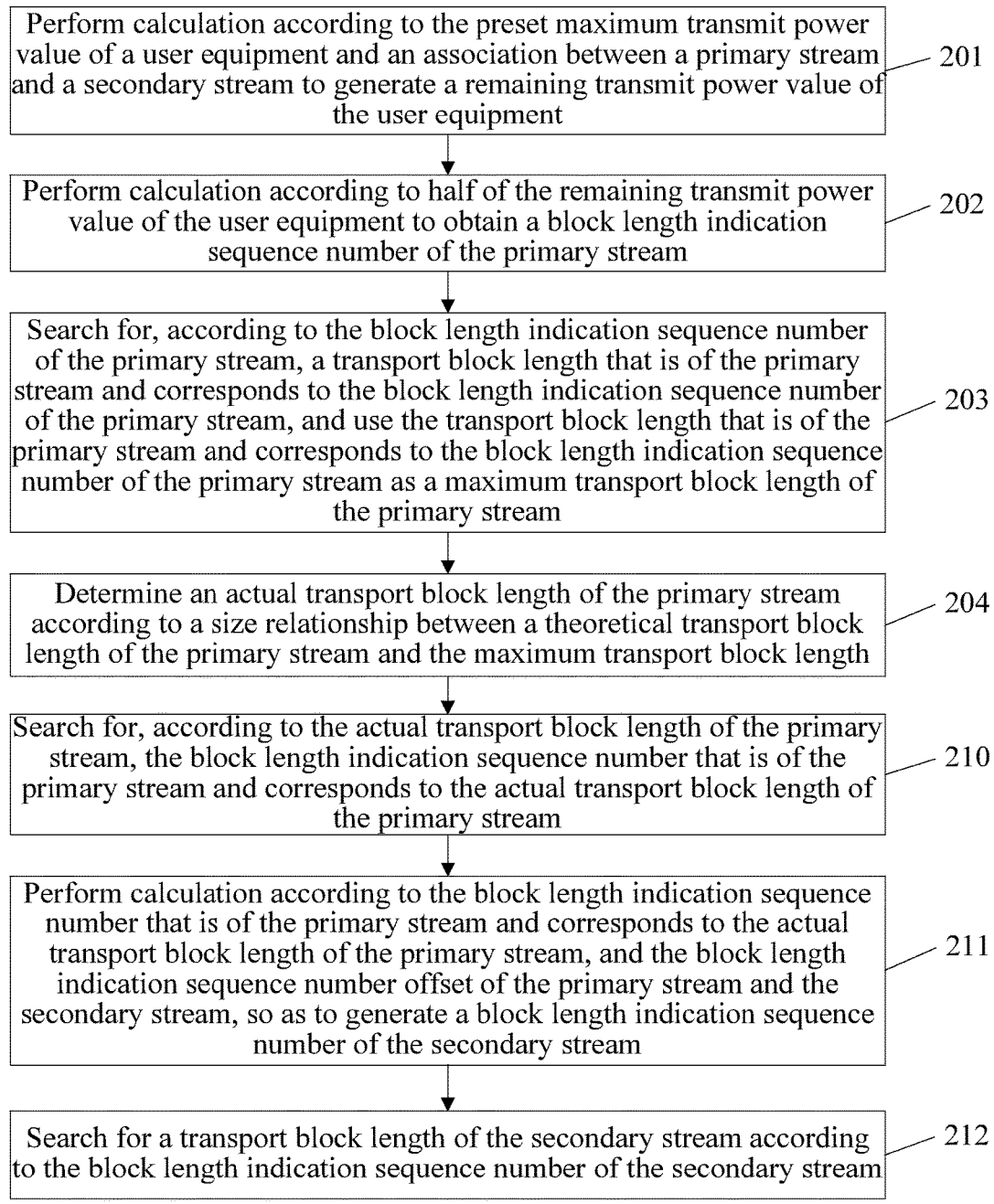
FIG. 3 is a flowchart of another method for selecting a transport format according to Embodiment 2 of the present invention.

In addition, it should be noted that, if the association, between the primary stream and the secondary stream, which is received by the user equipment and sent by the base station is a block length indication sequence number offset of the primary stream and the secondary stream, step 205 to step 209 may be substituted with the following steps. As shown in FIG. 3, the steps specifically include:

210. Search for, according to the actual transport block length of the primary stream, the block length indication sequence number that is of the primary stream and corresponds to the actual transport block length of the primary stream.

211. Perform calculation according to the block length indication sequence number that is of the primary stream and corresponds to the actual transport block length of the primary stream, and the block length indication sequence number offset of the primary stream and the secondary stream, so as to generate a block length indication sequence number of the secondary stream.

The performing calculation according to the corresponding block length indication sequence number of the primary stream and the block length indication sequence number offset of the primary stream and the secondary stream, so as to generate a block length indication sequence number of the secondary stream may be calculated according to the following formula, and the calculation formula is: Secondary stream E-TFCI=Primary stream E-TFCI−E-TFCI offset. The secondary stream E-TFCI is the block length indication sequence number of the secondary stream; the primary stream E-TFCI is the block length indication sequence number of the primary stream; and the E-TFCI offset is the block length indication sequence number offset of the primary stream and the secondary stream.

212. Search for the transport block length of the secondary stream according to the block length indication sequence number of the secondary stream.

An implementation method of the searching for the transport block length of the secondary stream according to the block length indication sequence number of the secondary stream is similar to an implementation method of step 203, which is not repeatedly described in this embodiment of the present invention.

According to a method for selecting a transport format provided in this embodiment of the present invention, a transport block length of a primary stream is generated by means of calculation according to a primary stream grant value and an association between the primary stream and a secondary stream, where the primary stream grant value and the association between the primary stream and the secondary stream are sent by a base station; and a transport block length of the secondary stream is generated according to the transport block length of the primary stream. A transport format of the primary stream and the secondary stream can be determined according to a maximum transmit power of a user equipment and a channel quality difference between the primary stream and the secondary stream, thereby ensuring data transmission quality, and decoding performance when data sent by the user equipment by using the two streams is decoded at a receive end of the base station.

Embodiment 3

Figure 4:
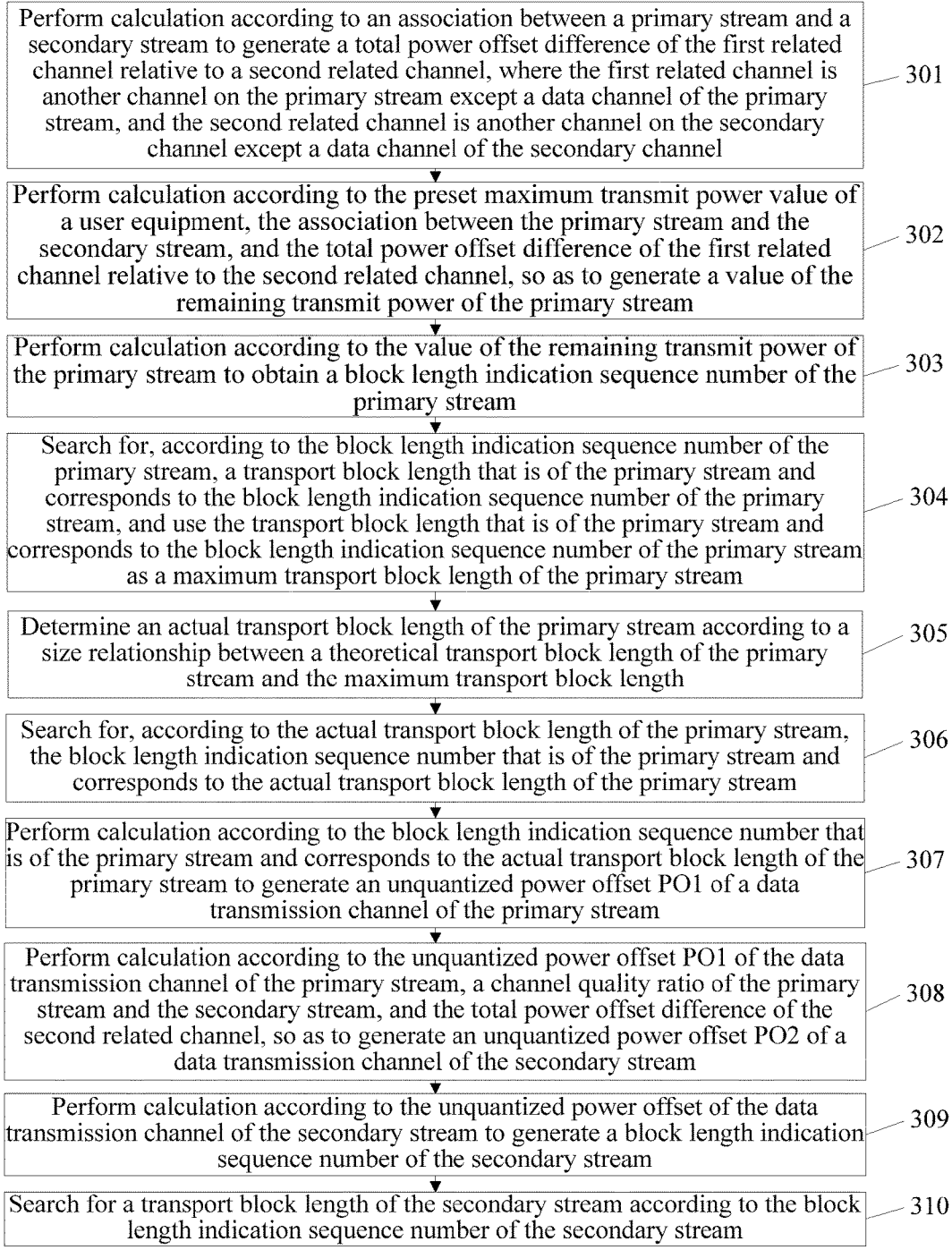
FIG. 4 is a flowchart of another method for selecting a transport format according to Embodiment 2 of the present invention.

This embodiment of the present invention provides a method for selecting a transport format, which is mainly applied to a process of selecting a transport format of a primary stream and a secondary stream when a user equipment sends information to a base station. When total channel transmit powers of the primary stream and the secondary stream are the same, as shown in FIG. 4, the method includes:

301. Perform calculation according to an association between the primary stream and the secondary stream to generate a total power offset difference of the first related channel relative to a second related channel, where the first related channel is another channel on the primary stream except a data channel of the primary stream, and the second related channel is another channel on the secondary channel except a data channel of the secondary channel.

The first related channel includes a DPCCH, a DPDCH, an HS-DPCCH, and an E-DPCCH. The second related channel includes an S-DPCCH and an S-E-DPCCH.

302. Perform calculation according to the preset value of a maximum transmit power of the user equipment, the association between the primary stream and the secondary stream, and the total power offset difference of the first related channel relative to the second related channel, so as to generate a value of the remaining transmit power of the primary stream.

The relative description of the preset value of the maximum transmit power of the user equipment is the same as the relative description of step 101, which is not repeatedly described in this embodiment of the present invention.

The step 301 to step 302 may be implemented in the following manner, including:

A value of m is determined first, where m indicates the total power offset difference of the second related channel and the calculation formula thereof is $m=(P_{DPCCH,target}+P_{DPDCH}+P_{HS-DPCCH}+P_{E-DPCCH,j}+P_{S-E-DPCCH,j,r+m}-P_{S-DPCCH})/P_{DPCCH,target}$, where $P_{DPCCH,target}$, $P_{S-DPCCH}$, $P_{DPDCH}$, and $P_{HS-DPCCH}$ respectively indicate transmit powers of the DPCCH, S-DPCCH, DPDCH, and HS-DPCCH channels; j indicates an E-TFCI of the primary stream; and r indicates a channel quality ratio of the primary stream and the secondary stream.

Then an available maximum transmit power $PMax_{j,r+m}$ of the user equipment in a case of current values of j, r, and m is calculated, while a back-off of the maximum transmit power needs to be considered. A calculation method is $PMax_{j,r+m}=PMax-TFC\_MPR_{j,r+m}$. A terminal calculates the remaining transmit power of the primary stream according to half of the available maximum power $PMax_{j,r+m}$ and a value of a transmit power of the second related channel, and a formula for calculating the remaining transmit power of the primary stream is $NRPM_{j,primary}=(PMax_{j,r+m}/2-P_{DPCCH,target}-P_{DPDCH}-P_{HS-DPCCH}-P_{E-DPCCH,j}-P_{S-E-DPCCH,j,r+m})/P_{DPCCH,target}$, where $P_{E-DPCCH,j}$ and $P_{S-E-DPCCH,j,r+m}$ indicate transmit powers of the E-DPCCH and the S-E-DPCCH obtained by means of calculation according to values of j, r, and m. Then a maximum transport block length that can be sent on the primary stream is determined according to the remaining transmit power of the primary stream.

It should be noted that, if the association, between the primary stream and the secondary stream, which is received by the user equipment and sent by the base station is a block length indication sequence number offset of the primary stream and the secondary stream, the block length indication sequence number offset of the primary stream and the secondary stream needs to be converted into the channel quality ratio of the primary stream and the secondary stream before subsequent calculations are performed. A specific manner is a technology well-known to a person skilled in the art, which is not described in detail in this embodiment of the present invention.

303. Perform calculation according to the value of the remaining transmit power of the primary stream to obtain a block length indication sequence number of the primary stream.

304. Search for, according to the block length indication sequence number of the primary stream, a transport block length that is of the primary stream and corresponds to the block length indication sequence number of the primary stream, and use the transport block length that is of the primary stream and corresponds to the block length indication sequence number of the primary stream as a maximum transport block length of the primary stream.

An implementation manner of the searching for, according to an actual transport block length of the primary stream, a block length indication sequence number that is of the primary stream and corresponds to the block length of the primary stream is the same as the implementation manner of step 203, which is not limited in this embodiment of the present invention.

305. Determine an actual transport block length of the primary stream according to a size relationship between a theoretical transport block length of the primary stream and the maximum transport block length.

An implementation manner of step 305 is the same as an implementation manner of step 102, which is not repeatedly described in this embodiment of the present invention.

306. Search for, according to the actual transport block length of the primary stream, the block length indication sequence number that is of the primary stream and corresponds to the actual transport block length of the primary stream.

The searching for, according to the actual transport block length of the primary stream, the block length indication sequence number that is of the primary stream and corresponds to the actual transport block length of the primary stream is the same as an implementation manner of step 205, which is not repeatedly described in this embodiment of the present invention.

307. Perform calculation according to the block length indication sequence number that is of the primary stream and corresponds to the actual transport block length of the primary stream to generate an unquantized power offset PO1 of a data transmission channel of the primary stream.

308. Perform calculation according to the unquantized power offset PO1 of the data transmission channel of the primary stream, a channel quality ratio of the primary stream and the secondary stream, and the total power offset difference of the first related channel relative to the second related channel, so as to generate an unquantized power offset PO2 of a data transmission channel of the secondary stream. PO2=(PO1+m)*r, where r is the channel quality ratio of the primary stream and the secondary stream, and m is the total power offset difference of the second related channel.

309. Perform calculation according to the unquantized power offset of the data transmission channel of the secondary stream to generate a block length indication sequence number of the secondary stream.

310. Search for a transport block length of the secondary stream according to the block length indication sequence number of the secondary stream.

An implementation manner of the searching for a transport block length of the secondary stream according to the block length indication sequence number of the secondary stream is the same as an implementation manner of step 209, which is not repeatedly described in this embodiment of the present invention.

Figure 5:
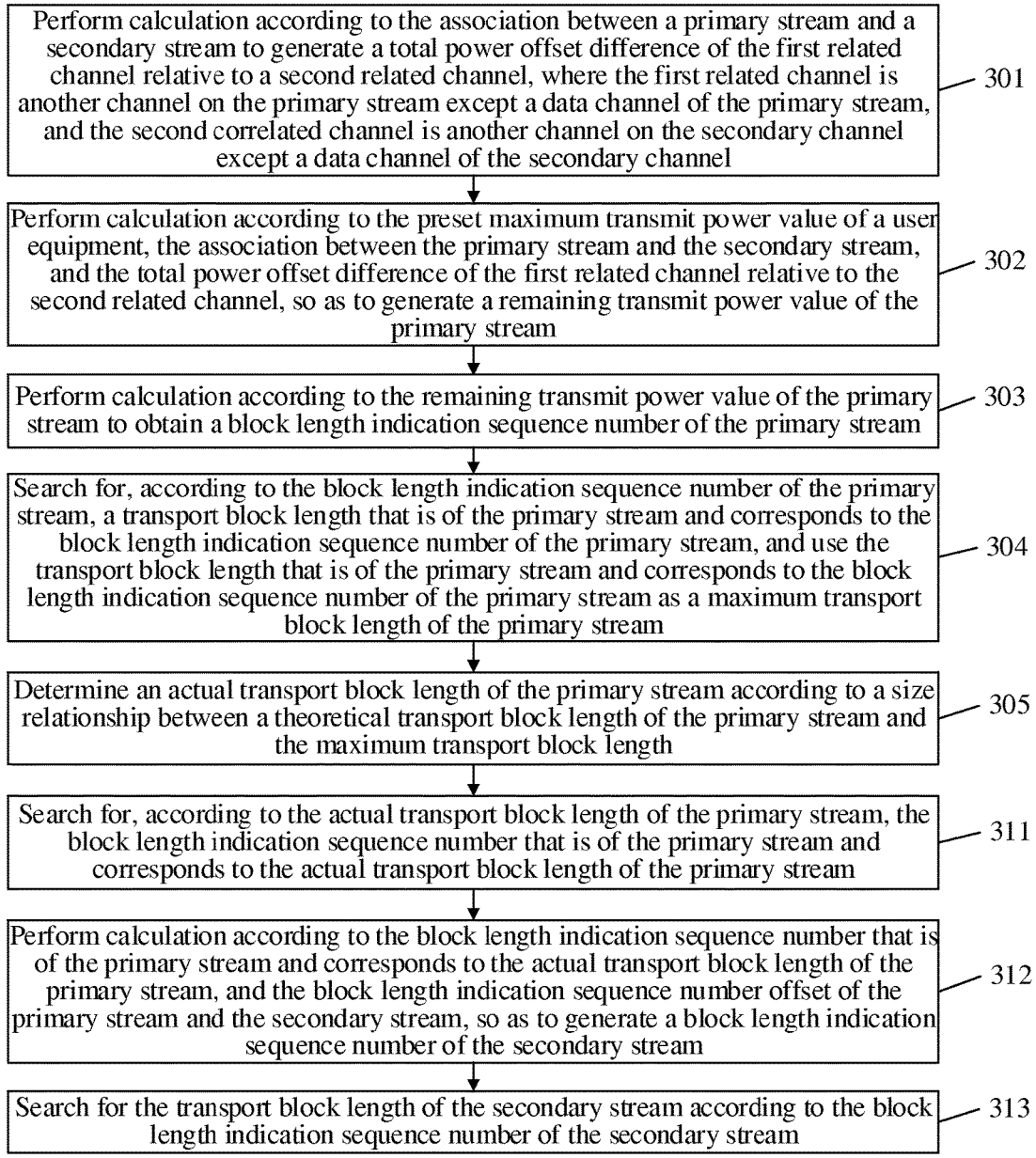
FIG. 5 is a flowchart of another method for selecting a transport format according to Embodiment 2 of the present invention.

In addition, it should be noted that, if the association, between the primary stream and the secondary stream, which is received by the user equipment and sent by the base station is a block length indication sequence number offset of the primary stream and the secondary stream, step 306 to step 310 may be substituted with the following steps. As shown in FIG. 5, the steps specifically include:

311. Search for, according to the actual transport block length of the primary stream, the block length indication sequence number that is of the primary stream and corresponds to the actual transport block length of the primary stream.

312. Perform calculation according to the block length indication sequence number that is of the primary stream and corresponds to the actual transport block length of the primary stream and the block length indication sequence number offset of the primary stream and the secondary stream, so as to generate a block length indication sequence number of the secondary stream.

The performing calculation according to the corresponding block length indication sequence number of the primary stream and the block length indication sequence number offset of the primary stream and the secondary stream, so as to generate a block length indication sequence number of the secondary stream may be calculated according to the following formula, and the formula is: Secondary E-TFCI=Primary stream E-TFCI−E-TFCI offset. The secondary stream E-TFCI is the block length indication sequence number of the secondary stream; the primary stream E-TFCI is the block length indication sequence number of the primary stream; and the E-TFCI offset is the block length indication sequence number offset of the primary stream and the secondary stream.

313. Search for the transport block length of the secondary stream according to the block length indication sequence number of the secondary stream.

An implementation method of the searching for the transport block length of the secondary stream according to the block length indication sequence number of the secondary stream is the same as an implementation method of step 212, which is not repeatedly described in this embodiment of the present invention.

According to a method for selecting a transport format provided in this embodiment of the present invention, a transport block length of a primary stream is generated by means of calculation according to a primary stream grant value and an association between the primary stream and a secondary stream, where the primary stream grant value and the association between the primary stream and the secondary stream are sent by a base station; and a transport block length of the secondary stream is generated according to the transport block length of the primary stream. A transport format of the primary stream and the secondary stream can be determined according to a maximum transmit power of a user equipment and a channel quality difference between the primary stream and the secondary stream, thereby ensuring data transmission quality, and decoding performance when data sent by the user equipment by using the two streams is decoded at a receive end of the base station.

Embodiment 4

Figure 6:
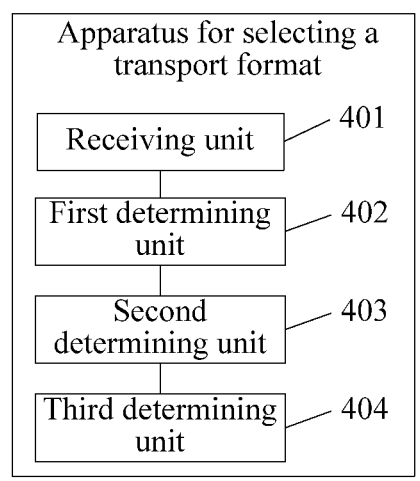
FIG. 6 is a composition block diagram of an apparatus for selecting a transport format according to Embodiment 3 of the present invention.

This embodiment of the present invention provides an apparatus for selecting a transport format. As shown in FIG. 6, the apparatus includes: a receiving unit 401, a first determining unit 402, a second determining unit 403, and a third determining unit 404.

The receiving unit 401 is configured to receive a transport format parameter of a user equipment sent by a base station, where the transport format parameter of the user equipment includes a primary stream grant value and an association between a primary stream and a secondary stream.

The first determining unit 402 is configured to determine a maximum transport block length of the primary stream.

The second determining unit 403 is configured to determine an actual transport block length of the primary stream according to a size relationship between a theoretical transport block length of the primary stream and the maximum transport block length determined by the first determining unit, where the theoretical transport block length of the primary stream is determined by a block length of scheduling grant data and/or a block length of non-scheduling grant data, where the scheduling grant data and the non-scheduling grant data are transmitted by the primary stream, and the block length of the scheduling grant data is determined by the primary stream grant value.

The third determining unit 404 is configured to determine a transport block length of the secondary stream according to the actual transport block length of the primary stream and the association between the primary stream and the secondary stream, where the actual transport block length of the primary stream is determined by the second determining unit.

Figure 7:
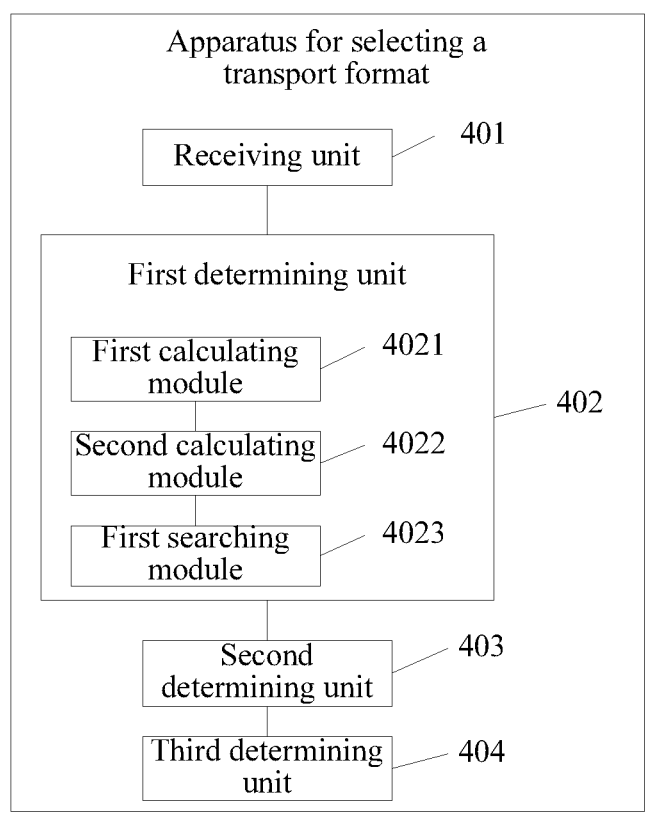
FIG. 7 is a composition block diagram of another apparatus for selecting a transport format according to Embodiment 3 of the present invention.

Further, as shown in FIG. 7, the first determining unit 402 includes: a first calculating module 4021, a second calculating module 4022, and a first searching module 4023.

The first calculating module 4021 is configured to, when transmit powers of data channels of the primary stream and the secondary stream are the same, perform calculation according to the preset value of a maximum transmit power of the user equipment and the association between the primary stream and the secondary stream, so as to generate a value of the remaining transmit power of the user equipment.

The second calculating module 4022 is configured to perform calculation according to half of the value of the remaining transmit power of the user equipment to obtain a block length indication sequence number of the primary stream, where the value of the remaining transmit power is obtained by the first calculating module 4021 by means of calculation.

The first searching module 4023 is configured to search for, according to the block length indication sequence number that is of the primary stream and obtained by the second calculating module 4022 by means of calculation, a transport block length that is of the primary stream and corresponds to the block length indication sequence number of the primary stream, and use the transport block length that is of the primary stream and corresponds to the block length indication sequence number of the primary stream as the maximum transport block length of the primary stream.

Figure 8:
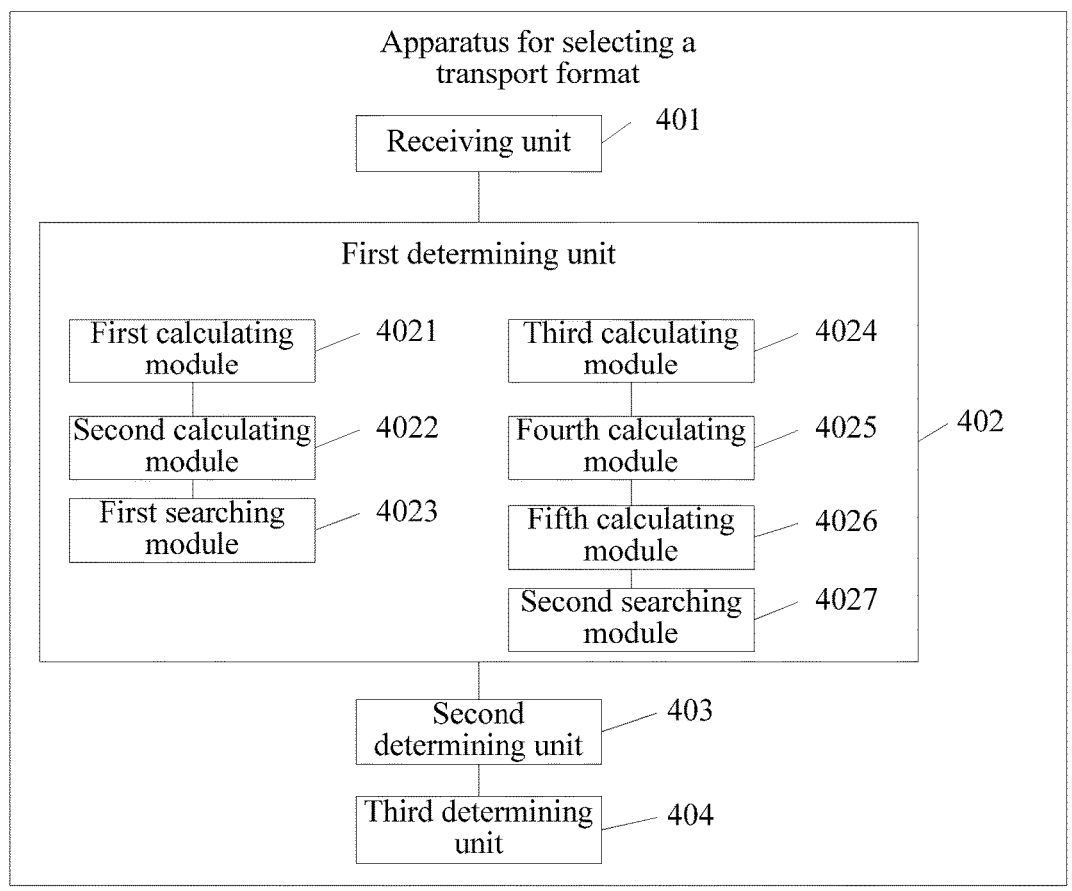
FIG. 8 is a composition block diagram of another apparatus for selecting a transport format according to Embodiment 3 of the present invention.

Further, as shown in FIG. 8, the first determining unit 402 further includes: a third calculating module 4024, a fourth calculating module 4025, a fifth calculating module 4026, and a second searching module 4027.

The third calculating module 4024 is configured to, when total channel transmit powers of the primary stream and the secondary stream are the same, perform calculation according to the association between the primary stream and the secondary stream, so as to generate a total power offset difference of the first related channel relative to a second related channel, where the first related channel is another channel on the primary stream except a data channel of the primary stream, and the second related channel is another channel on the secondary channel except a data channel of the secondary channel.

The fourth calculating module 4025 is configured to perform calculation according to the preset value of the maximum transmit power of the user equipment, the association between the primary stream and the secondary stream, and the total power offset difference of the first related channel relative to the first related channel, so as to generate a value of the remaining transmit power of the primary stream, where the total power offset difference is obtained by the third calculating module 4024 by means of calculation.

The fifth calculating module 4026 is configured to perform calculation according to the value of the remaining transmit power of the primary stream to obtain a block length indication sequence number of the primary stream, where the value of the remaining transmit power of the primary stream is obtained by the fourth calculating module 4025 by means of calculation.

The second searching module 4027 is configured to search for, according to the block length indication sequence number of the primary stream, a transport block length that is of the primary stream and corresponds to the block length indication sequence number of the primary stream, where the block length indication sequence number of the primary stream is obtained by the fifth calculating module 4026 by means of calculation, and use the transport block length that is of the primary stream and corresponds to the block length indication sequence number of the primary stream as the maximum transport block length of the primary stream.

Figure 9:
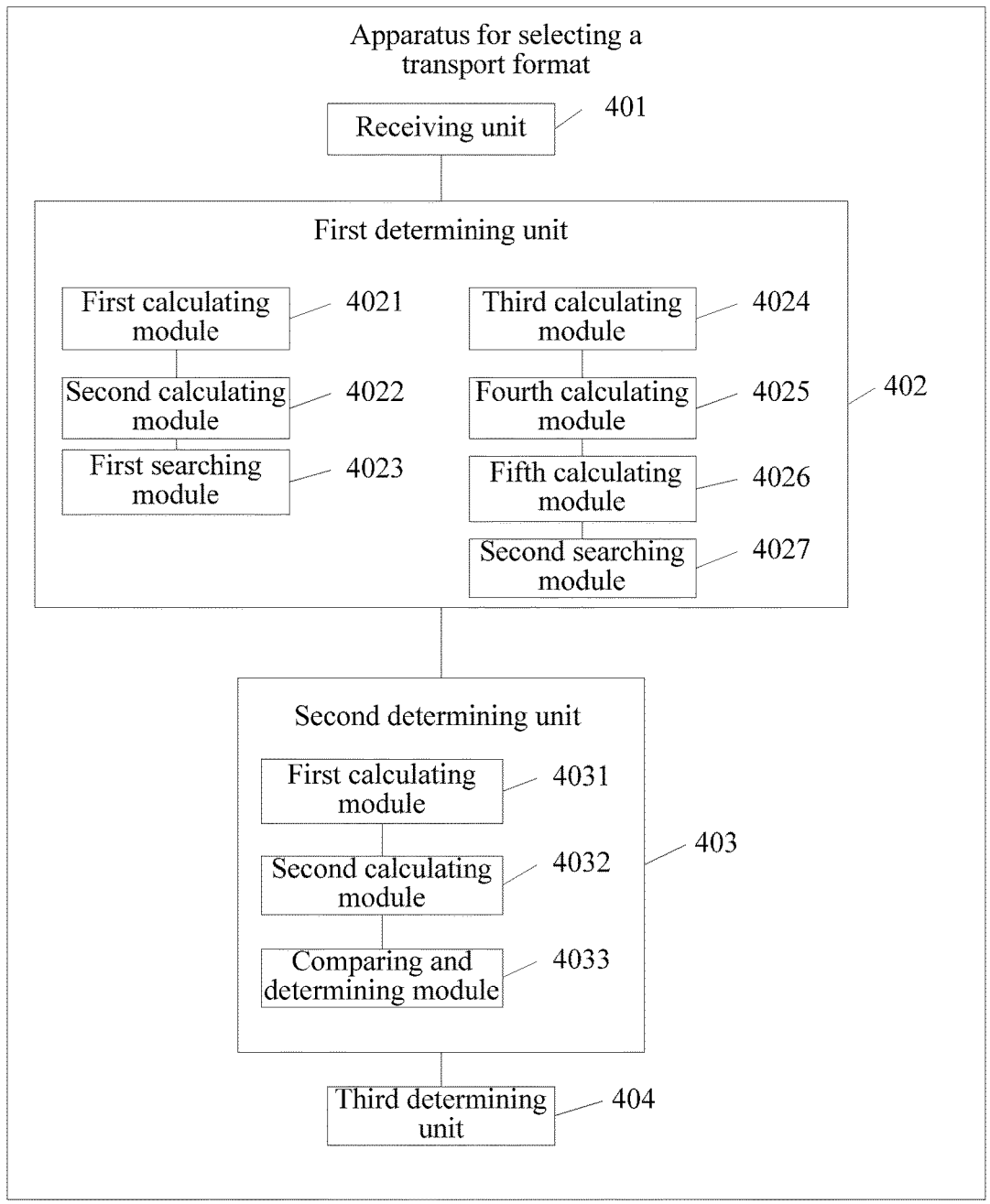
FIG. 9 is a composition block diagram of another apparatus for selecting a transport format according to Embodiment 3 of the present invention.

Further, as shown in FIG. 9, the second determining unit 403 includes: a first calculating module 4031, a second calculating module 4032, and a comparing and determining module 4033.

The first calculating module 4031 is configured to perform calculation according to the primary stream grant value to generate the block length of the scheduling grant data.

The second calculating module 4032 is configured to acquire the block length of the non-scheduling grant data, and perform calculation by adding half of the block length of the scheduling grant data to the block length of the non-scheduling grant data to obtain the theoretical transport block length of the primary stream, where the block length of the scheduling grant data is obtained by the first calculating module 4031 by means of calculation.

The comparing and determining module 4033 is configured to compare a value of the theoretical transport block length of the primary stream with a value of the maximum transport block length, and determine that the smaller one of the two is used as the actual transport block length of the primary stream, where the theoretical transport block length of the primary stream is obtained by the second calculating module 4032 by means of calculation.

Figure 10:
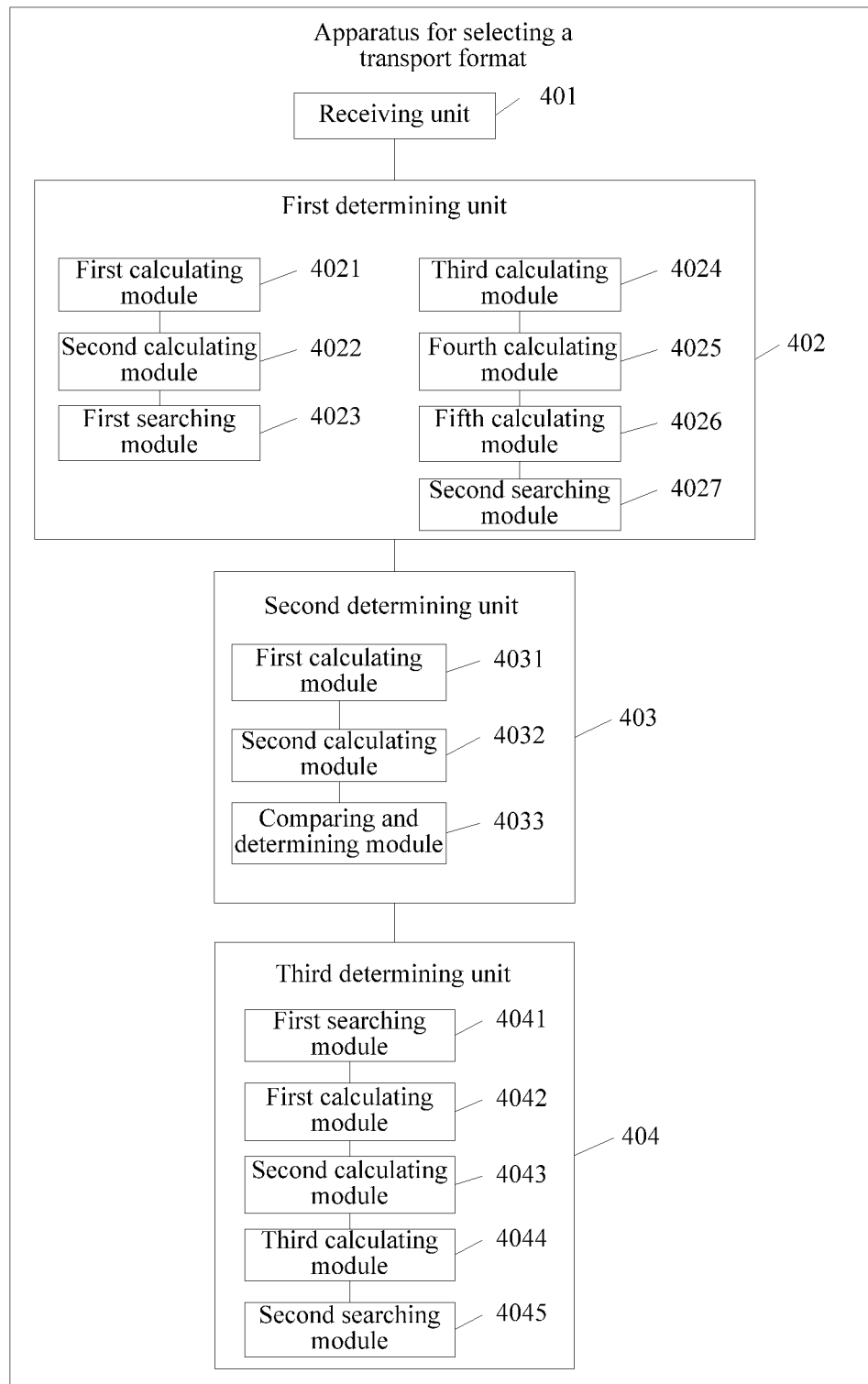
FIG. 10 is a composition block diagram of another apparatus for selecting a transport format according to Embodiment 3 of the present invention.

Further, as shown in FIG. 10, the third determining unit 404 includes: a first searching module 4041, a first calculating module 4042, a second calculating module 4043, a third calculating module 4044, and a second searching module 4045.

The first searching module 4041 is configured to search for, when the association between the primary stream and the secondary stream is the channel quality ratio of the primary stream and the secondary stream and according to the actual transport block length of the primary stream, the block length indication sequence number that is of the primary stream and corresponds to the actual transport block length of the primary stream.

The first calculating module 4042 is configured to perform calculation according to the block length indication sequence number that is of the primary stream and corresponds to the actual transport block length of the primary stream, so as to generate an unquantized power offset of a data transmission channel of the primary stream, where the block length indication sequence number of the primary stream is found by the first searching module 4041.

The second calculating module 4043 is configured to perform calculation according to the unquantized power offset of the data transmission channel of the primary stream and the channel quality ratio of the primary stream and the secondary stream, so as to generate an unquantized power offset of a data transmission channel of the secondary stream, where the unquantized power offset of the data transmission channel of the primary stream is obtained by the first calculating module 4042 by means of calculation.

In addition, the second calculating module is further configured to perform calculation according to the unquantized power offset of the data transmission channel of the primary stream, the channel quality ratio of the primary stream and the secondary stream, and the total power offset difference of the second related channel, so as to generate the unquantized power offset of the data transmission channel of the secondary stream.

The third calculating module 4044 is configured to perform calculation according to the unquantized power offset of the data transmission channel of the secondary stream, so as to generate a block length indication sequence number of the secondary stream, where the unquantized power offset of the data transmission channel of the secondary stream is obtained by the second calculating module 4043 by means of calculation.

The second searching module 4045 is configured to search for the transport block length of the secondary stream according to the block length indication sequence number of the secondary stream, where the block length indication sequence number is obtained by the third calculating module 4044 by means of calculation.

Figure 11:
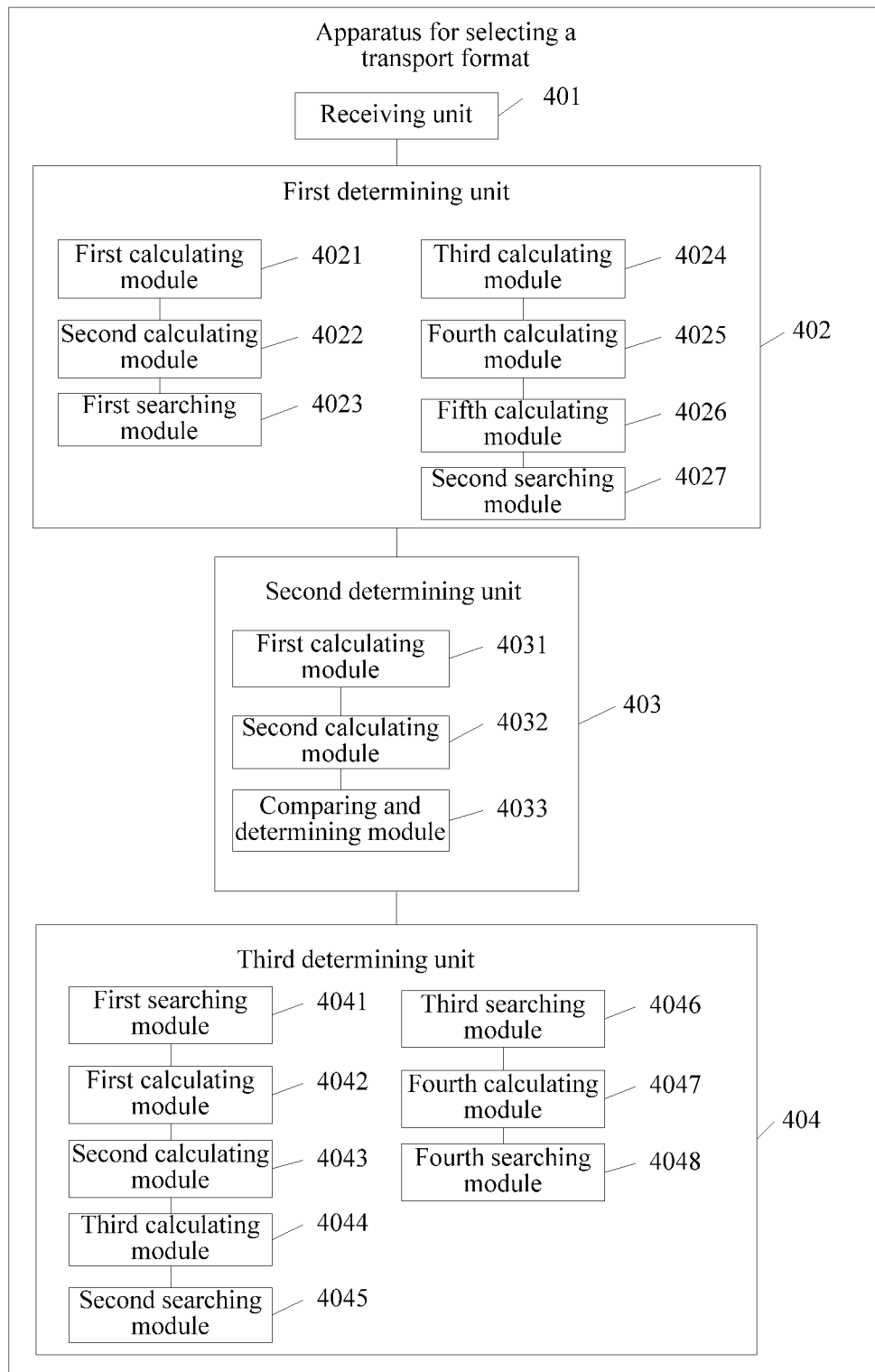
FIG. 11 is a composition block diagram of another apparatus for selecting a transport format according to Embodiment 3 of the present invention.

Further, as shown in FIG. 11, the third determining unit 404 further includes: a third searching module 4046, a fourth calculating module 4047, and a fourth searching module 4048.

The third searching module 4046 is configured to search for, when the association between the primary stream and the secondary stream is the block length indication sequence number offset of the primary stream and the secondary stream and according to the actual transport block length of the primary stream, the block length indication sequence number that is of the primary stream and corresponds to the actual transport block length of the primary stream.

The fourth calculating module 4047 is configured to perform calculation according to the block length indication sequence number that is of the primary stream and corresponds to the actual transport block length of the primary stream, and the block length indication sequence number offset of the primary stream and the secondary stream, so as to generate a block length indication sequence number of the secondary stream, where the block length indication sequence number of the primary stream is found by the third searching module 4046.

The fourth searching module 4048 is configured to search for the transport block length of the secondary stream according to the block length indication sequence number of the secondary stream, where the block length indication sequence number is obtained by the fourth calculating module 4047 by means of calculation.

Figure 12:
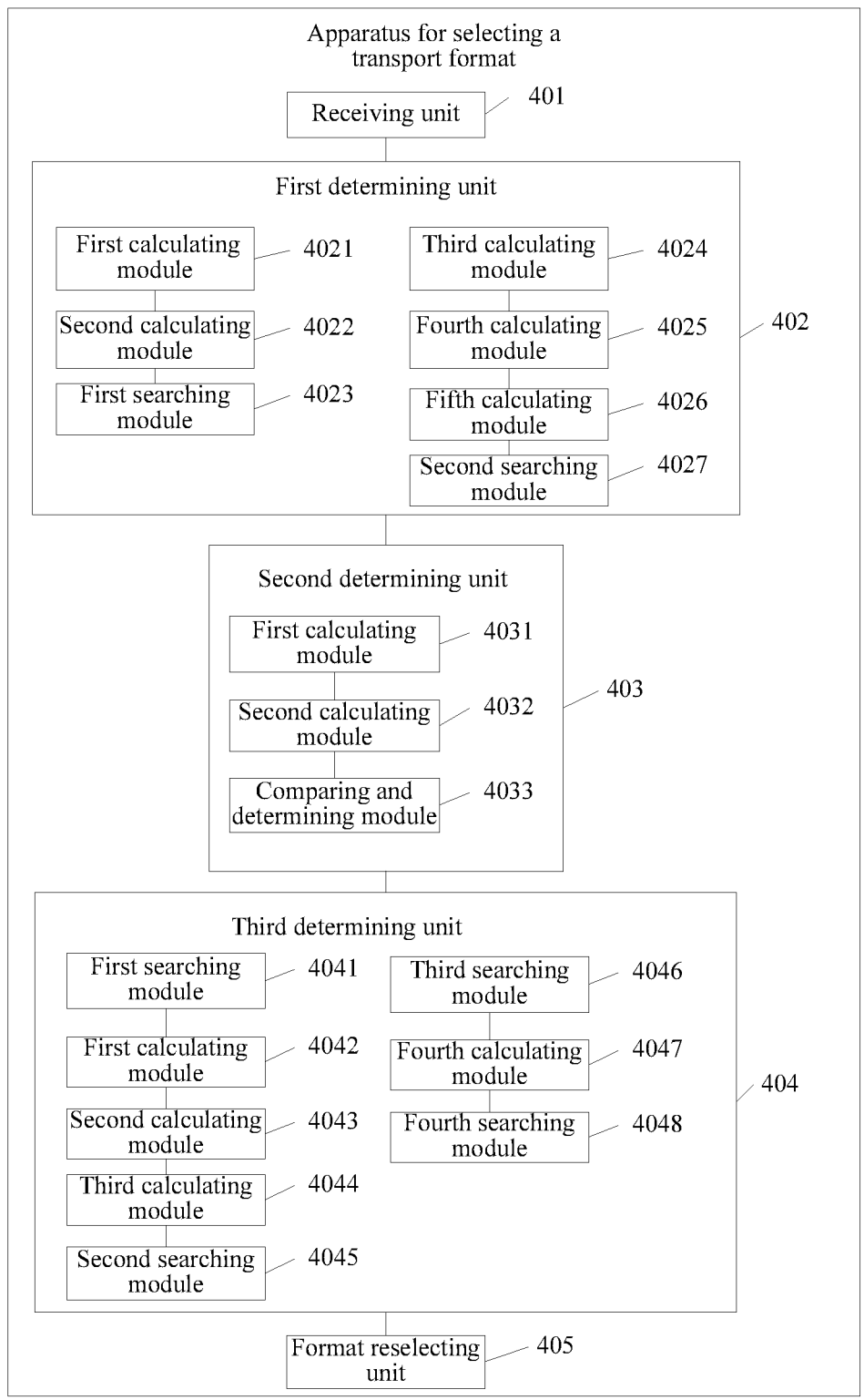
FIG. 12 is a composition block diagram of another apparatus for selecting a transport format according to Embodiment 3 of the present invention.

Further, as shown in FIG. 12, the apparatus further includes a format reselecting unit 405.

The format reselecting unit 405, where if there is at least one stream used for data retransmission in the primary stream and the secondary stream, a data block length used by the stream that is used for data retransmission is the same as a data block length used by a stream that initially transmits the data.

According to an apparatus for selecting a transport format provided in this embodiment of the present invention, a transport block length of a primary stream is generated by means of calculation according to a primary stream grant value and an association between the primary stream and a secondary stream, where the primary stream grant value and the association between the primary stream and the secondary stream are sent by a base station; and a transport block length of the secondary stream is generated according to the transport block length of the primary stream. A transport format of the primary stream and the secondary stream can be determined according to a maximum transmit power of a user equipment and a channel quality difference between the primary stream and the secondary stream, thereby ensuring data transmission quality, and decoding performance when data sent by the user equipment by using the two streams is decoded at a receive end of the base station.

Based on the foregoing descriptions of the implementation manners, a person skilled in the art may clearly understand that the present invention may be implemented by software in addition to necessary universal hardware or by hardware only. In most circumstances, the former is a preferred implementation manner. Based on such an understanding, the technical solutions of the present invention essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for selecting a transport format, comprising:
receiving a transport format parameter of a user equipment sent by a base station, wherein the transport format parameter of the user equipment comprises a primary stream grant value and an association between a primary stream and a secondary stream;
determining a maximum transport block length of the primary stream;
determining an actual transport block length of the primary stream according to a size relationship between a theoretical transport block length of the primary stream and the maximum transport block length, wherein the theoretical transport block length of the primary stream is determined by a block length of scheduling grant data and/or a block length of non-scheduling grant data, wherein the scheduling grant data and the non-scheduling grant data are transmitted by the primary stream, wherein the block length of the scheduling grant data is determined by the primary stream grant value, and wherein the theoretical transport block length of the primary stream is obtained by acquiring the block length of the non-scheduling grant data and performing calculation by adding half of the block length of the scheduling grant data to the block length of the non-scheduling grant data to obtain the theoretical transport block length of the primary stream;
determining a transport block length of the secondary stream according to the actual transport block length of the primary stream and the association between the primary stream and the secondary stream; and
selecting the transport format of the primary stream and of the secondary stream according to a maximum transmit power of the user equipment and a channel quality difference between the primary stream and the secondary stream.

2. The method for selecting the transport format according to claim 1, wherein, when transmit powers of data channels of the primary stream and the secondary stream are the same, determining the maximum transport block length of the primary stream comprises:
performing calculation according to a preset value of the maximum transmit power of the user equipment and the association between the primary stream and the secondary stream to generate a value of a remaining transmit power of the user equipment;
performing calculation according to half of the value of the remaining transmit power of the user equipment to obtain a block length indication sequence number of the primary stream;
searching for, according to the block length indication sequence number of the primary stream, a transport block length that is of the primary stream and corresponds to the block length indication sequence number of the primary stream; and using the transport block length that is of the primary stream and corresponds to the block length indication sequence number of the primary stream as the maximum transport block length of the primary stream.

3. The method for selecting the transport format according to claim 1, wherein, when total channel transmit powers of the primary stream and the secondary stream are the same, determining the maximum transport block length of the primary stream comprises:
performing calculation according to the association between the primary stream and the secondary stream to generate a total power offset difference of a first related channel relative to a second related channel, wherein the first related channel is another channel on the primary stream except a data channel of the primary stream, and wherein the second related channel is another channel on the secondary channel except a data channel of the secondary channel;
performing calculation according to a preset value of the maximum transmit power of the user equipment, the association between the primary stream and the secondary stream, and the total power offset difference of the first related channel relative to the second related channel to generate a value of the remaining transmit power of the primary stream;
performing calculation according to the value of the remaining transmit power of the primary stream to obtain a block length indication sequence number of the primary stream;
searching for, according to the block length indication sequence number of the primary stream, a transport block length that is of the primary stream and corresponds to the block length indication sequence number of the primary stream; and
using the transport block length that is of the primary stream and corresponds to the block length indication sequence number of the primary stream as the maximum transport block length of the primary stream.

4. The method for selecting the transport format according to claim 1, wherein determining the actual transport block length of the primary stream according to the size relationship between the theoretical transport block length of the primary stream and the maximum transport block length, comprises:
performing calculation according to the primary stream grant value to generate the block length of the scheduling grant data;
comparing a value of the theoretical transport block length of the primary stream with a value of the maximum transport block length; and
determining that the smaller one of the two is used as the actual transport block length of the primary stream.

5. The method for selecting the transport format according to claim 1, wherein the association between the primary stream and the secondary stream comprises a channel quality ratio of the primary stream and the secondary stream, or a block length indication sequence number offset of the primary stream and the secondary stream.

6. The method for selecting the transport format according to claim 5, wherein, when the association between the primary stream and the secondary stream is the channel quality ratio of the primary stream and the secondary stream, determining the transport block length of the secondary stream according to the actual transport block length of the primary stream and the association between the primary stream and the secondary stream comprises:

searching for, according to the actual transport block length of the primary stream, the block length indication sequence number that is of the primary stream and corresponds to the actual transport block length of the primary stream;
performing calculation according to the block length indication sequence number that is of the primary stream and corresponds to the actual transport block length of the primary stream to generate an unquantized power offset of a data transmission channel of the primary stream;
performing calculation according to the unquantized power offset of the data transmission channel of the primary stream and the channel quality ratio of the primary stream and the secondary stream to generate an unquantized power offset of a data transmission channel of the secondary stream;
performing calculation according to the unquantized power offset of the data transmission channel of the secondary stream to generate a block length indication sequence number of the secondary stream; and
searching for the transport block length of the secondary stream according to the block length indication sequence number of the secondary stream.

7. The method for selecting the transport format according to claim 6, wherein performing calculation according to the unquantized power offset of the data transmission channel of the primary stream and the channel quality ratio of the primary stream and the secondary stream to generate the unquantized power offset of the data transmission channel of the secondary stream comprises performing calculation according to the unquantized power offset of the data transmission channel of the primary stream, the channel quality ratio of the primary stream and the secondary stream, and the total power offset difference of the first related channel relative to the second related channel to generate the unquantized power offset of the data transmission channel of the secondary stream.

8. The method for selecting the transport format according to claim 5, wherein, when the association between the primary stream and the secondary stream is the block length indication sequence number offset of the primary stream and the secondary stream, determining the transport block length of the secondary stream according to the transport block length of the primary stream and the association between the primary stream and the secondary stream further comprises:
searching for, according to the actual transport block length of the primary stream, the block length indication sequence number that is of the primary stream and corresponds to the actual transport block length of the primary stream;
performing calculation according to the block length indication sequence number that is of the primary stream and corresponds to the actual transport block length of the primary stream and the block length indication sequence number offset of the primary stream and the secondary stream to generate a block length indication sequence number of the secondary stream; and
searching for the transport block length of the secondary stream according to the block length indication sequence number of the secondary stream.

9. The method for selecting the transport format according to claim 1, wherein after determining the transport block length of the secondary stream according to the transport block length of the primary stream and the association between the primary stream and the secondary stream, the method further comprises that a data block length used by the stream that is used for data retransmission is the same as a data block length used by a stream that initially transmits the data when at least one stream is used for data retransmission in the primary stream and the secondary stream.

10. The method for selecting the transport format according to claim 1, wherein the non-scheduling grant data is borne on a stream for transmission, and wherein the stream is in the primary stream and the secondary stream and performs outer loop power control.

11. An apparatus for selecting a transport format, comprising:
a non-transitory computer readable medium having instruction stored thereon; and
a computer processor coupled to the non-transitory computer readable medium and configured to execute the instructions to:
receive a transport format parameter of a user equipment sent by a base station, wherein the transport format parameter of the user equipment comprises a primary stream grant value and an association between a primary stream and a secondary stream;
determine a maximum transport block length of the primary stream;
determine an actual transport block length of the primary stream according to a size relationship between a theoretical transport block length of the primary stream and the maximum transport block length determined by the first determining unit, wherein the theoretical transport block length of the primary stream is determined by a block length of scheduling grant data and/or a block length of non-scheduling grant data, wherein the scheduling grant data and the non-scheduling grant data are transmitted by the primary stream, wherein the block length of the scheduling grant data is determined by the primary stream grant value, and wherein the theoretical transport block length of the primary stream is obtained by acquiring the block length of the non-scheduling grant data and performing calculation by adding half of the block length of the scheduling grant data to the block length of the non-scheduling grant data to obtain the theoretical transport block length of the primary stream;
determine a transport block length of the secondary stream according to the actual transport block length of the primary stream and the association between the primary stream and the secondary stream; and
select the transport format of the primary stream and of the secondary stream according to a maximum transmit power of the user equipment and a channel quality difference between the primary stream and the secondary stream.

12. The apparatus for selecting the transport format according to claim 11, wherein the computer processor is configured to execute the instructions to:
perform calculation according to a preset value of the maximum transmit power of the user equipment and the association between the primary stream and the secondary stream, to generate a value of a remaining transmit power of the user equipment when transmit powers of data channels of the primary stream and the secondary stream are the same;
perform calculation according to half of the value of the remaining transmit power of the user equipment to obtain a block length indication sequence number of the primary stream; and search for, according to the block length indication sequence number that is of the primary stream and obtained by the second calculating module by means of calculation, a transport block length that is of the primary stream and corresponds to the block length indication sequence number of the primary stream; and
use the transport block length that is of the primary stream and corresponds to the block length indication sequence number of the primary stream as the maximum transport block length of the primary stream.

13. The apparatus for selecting the transport format according to claim 11, wherein the computer processor is configured to execute the instructions to:
perform calculation according to the association between the primary stream and the secondary stream to generate a total power offset difference of a first related channel relative to a second related channel when total channel transmit powers of the primary stream and the secondary stream are the same, wherein the first related channel is another channel on the primary stream except a data channel of the primary stream, and wherein the second related channel is another channel on the secondary channel except a data channel of the secondary channel;
perform calculation according to a preset value of the maximum transmit power of the user equipment, the association between the primary stream and the secondary stream, and the total power offset difference of the first related channel relative to the first related channel to generate a value of the remaining transmit power of the primary stream;
perform calculation according to the value of the remaining transmit power of the primary stream to obtain a block length indication sequence number of the primary stream;
search for, according to the block length indication sequence number of the primary stream, a transport block length that is of the primary stream and corresponds to the block length indication sequence number of the primary stream; and
use the transport block length that is of the primary stream and corresponds to the block length indication sequence number of the primary stream as the maximum transport block length of the primary stream.

14. The apparatus for selecting the transport format according to claim 11, wherein the computer processor is configured to execute the instructions to:
perform calculation according to the primary stream grant value to generate the block length of the scheduling grant data;
compare a value of the theoretical transport block length of the primary stream with a value of the maximum transport block length; and
determine that the smaller one of the two is used as the actual transport block length of the primary stream.

15. The apparatus for selecting the transport format according to claim 11, wherein the association between the primary stream and the secondary stream comprises a channel quality ratio of the primary stream and the secondary stream, or a block length indication sequence number offset of the primary stream and the secondary stream.

16. The apparatus for selecting the transport format according to claim 15, wherein the computer processor is configured to execute the instructions to:
search for, when the association between the primary stream and the secondary stream is the channel quality ratio of the primary stream and the secondary stream and according to the actual transport block length of the primary stream, the block length indication sequence number that is of the primary stream and corresponds to the actual transport block length of the primary stream;

perform calculation according to the block length indication sequence number that is of the primary stream and corresponds to the actual transport block length of the primary stream to generate an unquantized power offset of a data transmission channel of the primary stream;

perform calculation according to the unquantized power offset of the data transmission channel of the primary stream and the channel quality ratio of the primary stream and the secondary stream to generate an unquantized power offset of a data transmission channel of the secondary stream;

perform calculation according to the unquantized power offset of the data transmission channel of the secondary stream to generate a block length indication sequence number of the secondary stream; and search for the transport block length of the secondary stream according to the block length indication sequence number of the secondary stream.

17. The apparatus for selecting the transport format according to claim 15, wherein the computer processor is configured to execute the instructions to perform calculation according to the unquantized power offset of the data transmission channel of the primary stream, the channel quality ratio of the primary stream and the secondary stream, and the total power offset difference of the second related channel to generate the unquantized power offset of the data transmission channel of the secondary stream.

18. The apparatus for selecting the transport format according to claim 15, wherein the computer processor is configured to execute the instructions to:

search for, when the association between the primary stream and the secondary stream is the block length indication sequence number offset of the primary stream and the secondary stream and according to the actual transport block length of the primary stream, the block length indication sequence number that is of the primary stream and corresponds to the actual transport block length of the primary stream;

perform calculation according to the block length indication sequence number that is of the primary stream and corresponds to the actual transport block length of the primary stream, and the block length indication sequence number offset of the primary stream and the secondary stream to generate a block length indication sequence number of the secondary stream; and search for the transport block length of the secondary stream according to the block length indication sequence number of the secondary stream.

19. The apparatus for selecting the transport format according to claim 11, wherein the computer processor is configured to execute the instructions to set that a data block length used by the stream that is used for data retransmission is the same as a data block length used by a stream that initially transmits the data when at least one stream is used for data retransmission in the primary stream and the secondary stream.

\* \* \* \* \*